T. SHEHAN.
DEVICE FOR CUTTING SCREW THREADS.
APPLICATION FILED DEC. 15, 1913.
1,177,283.
Patented Mar. 28, 1916.
2 SHEETS—SHEET 1.
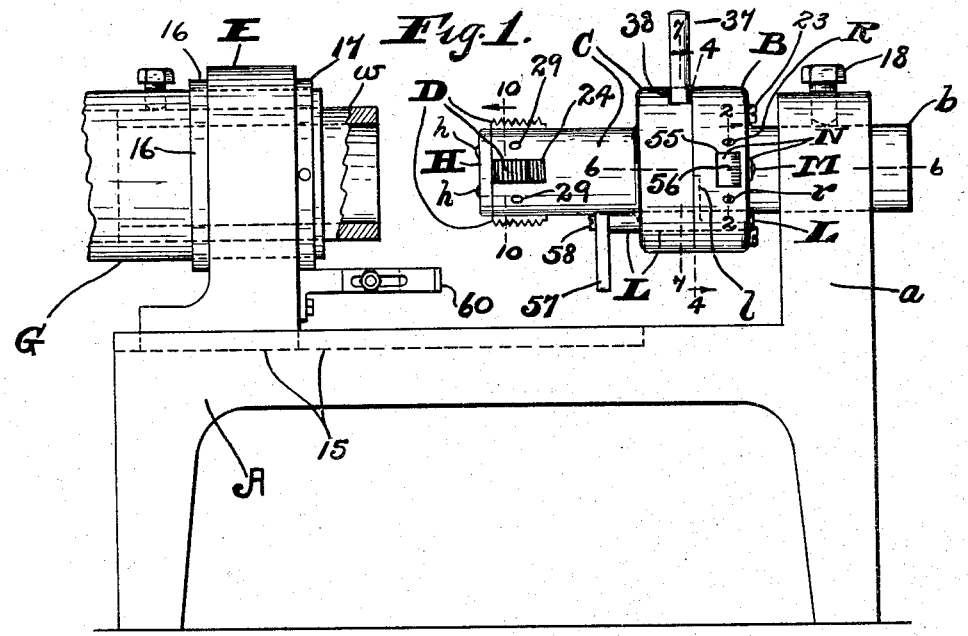
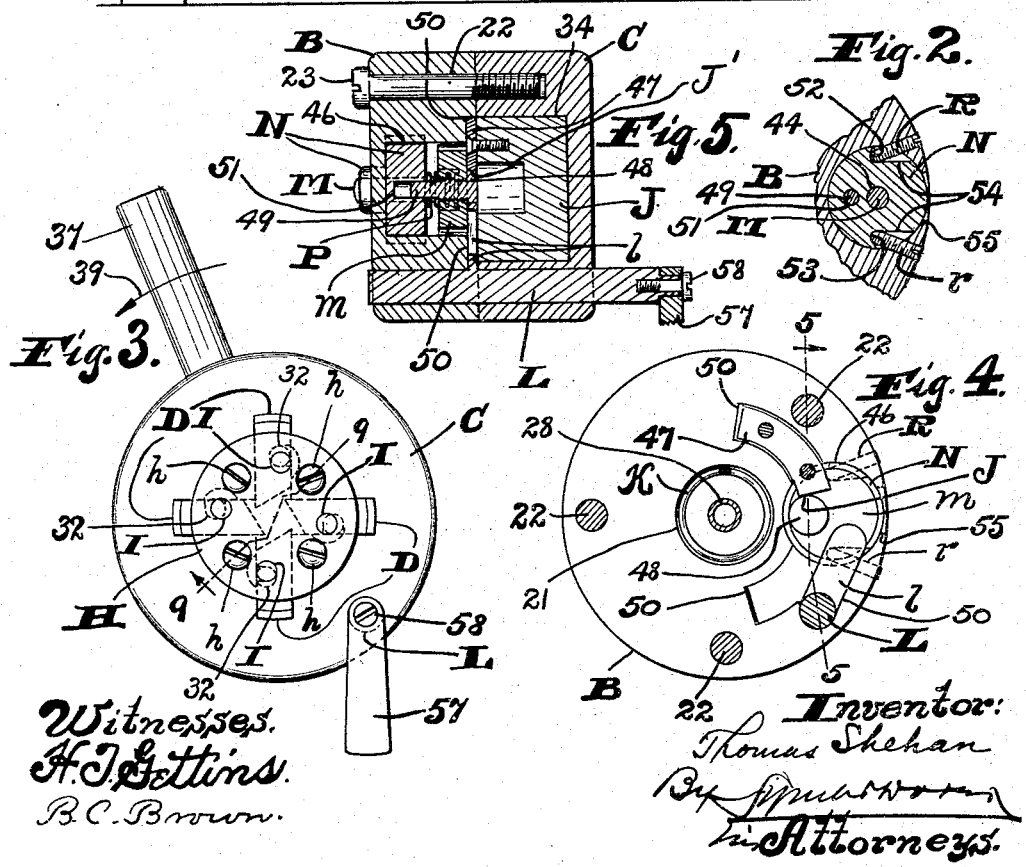

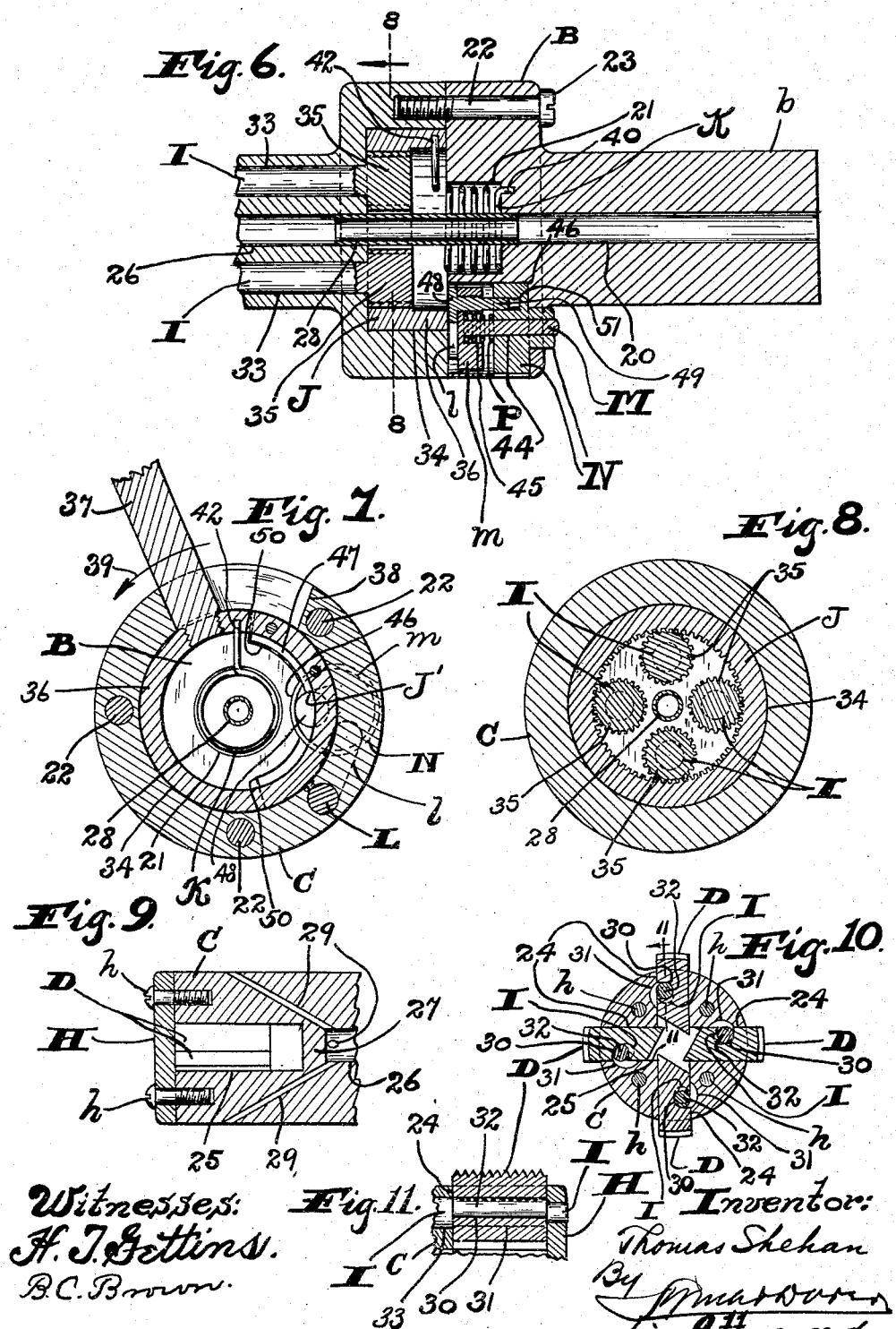

UNITED STATES PATENT OFFICE.

THOMAS SHEHAN, OF CLEVELAND, OHIO.

DEVICE FOR CUTTING SCREW-THREADS.

1,177,283.  Specification of Letters Patent.  Patented Mar. 28, 1916.

Application filed December 15, 1913. Serial No. 806,743.

*To all whom it may concern:*

Be it known that I, THOMAS SHEHAN, a citizen of the United States of America, residing at Cleveland, in the county of Cuyahoga and State of Ohio, have invented certain new and useful Improvements in Devices for Cutting Screw-Threads; and I hereby declare the following to be a full, clear, and exact description of the invention, such as will enable others skilled in the art to which it pertains to make and use the same.

This invention relates to improvements in devices for cutting screw-threads, and more especially to a collapsible tap or device adapted for cutting internal screw-threads and comprising a cutter-head which has a centrally located bore extending endwise or longitudinally of the cutter-head and is provided in its forward portion with radially arranged guideways which are spaced circumferentially of said bore and engaged by cutters adapted for cutting screw-threads.

One object of this invention is to provide improved simple, durable and reliable means for shifting or adjusting the cutters simultaneously.

Another object is to provide improved means whereby the cutters, upon having completed their cutting operation on the object to be screw-threaded, are automatically and simultaneously and correspondingly withdrawn from the work.

Another object is to provide means whereby the cutters, when they are in an operative position for cutting a screw-thread, can be readily and simultaneously and correspondingly readjusted for making a deeper or shallower cut.

Another object is to render the cutters readily replaceable by other cutters.

With these objects in view, and to the end of attaining any other advantage hereinafter appearing, this invention consists in certain features of construction, and combinations and arrangement of parts, hereinafter described, pointed out in the claims, and illustrated in the accompanying drawings.

In said drawings, Figure 1 is a side view of a portion of a lathe provided with my improved device for cutting screw-threads, and a portion of the object or work which is to be internally screw-threaded by said device is shown in section to disclose its hollow character. Fig. 2 is a section, in detail, on line 2—2, Fig. 1, looking in the direction indicated by the arrow. Fig. 3 is a forward end view of my improved device for cutting screw-threads. Fig. 4 is a vertical section on line 4—4, Fig. 1, looking rearwardly. Fig. 5 is a section on line 5—5, Fig. 4, looking outwardly. Fig. 6 is a horizontal section on line 6—6, Fig. 1, looking downwardly. Fig. 7 is a vertical section on line 7—7, Fig. 1, looking rearwardly. Fig. 8 is a vertical section on line 8—8, Fig. 6, looking forwardly. Fig. 9 is a section on line 9—9, Fig. 3, looking in the direction indicated by the arrow. Fig. 10 is a vertical section on line 10—10, Fig. 1, looking forwardly. Fig. 11 is a section on line 11—11, Fig. 10, looking in the direction indicated by the arrow. Fig. 1 is drawn on a smaller scale than the remaining figures which are drawn on the same scale.

Referring to Fig. 1 of the drawings, A indicates the bed of a lathe which is provided with an upright standard *a* from which my improved collapsible tap or device for cutting screw-threads is supported. Said device for cutting screw-threads comprises a stock B and a cutter-head C, and D indicates the cutters of the cutter-head. A work-feeding head E is shown engaging a slideway 15 formed in the bed A, and said slideway is arranged as required to enable said head to be moved toward and from the tap or device for cutting screw-threads. G indicates a horizontally arranged spindle which has bearing in the head E and is parallel with the slideway 15 and provided with two collars 16 and 17 arranged to prevent endwise movement of the spindle in opposite directions independently of said head. Said spindle is suitably rotated, and the head E is shifted endwise of the slideway 15 in any approved manner so as to shift the spindle endwise during the rotation of the spindle. Means for rotating a spindle while the spindle is being shifted endwise are too well known in the art to require illustration and description in this specification. Suffice it to state that said spindle is employed as work-holder, and *w*, Fig. 1, indicates the work, such, for instance, as a tubular or hollow member, which is carried by the spindle and arranged to be operated on by the cutters D during the feeding of the work the extent required.

The stock B is circular externally and provided centrally with a rearwardly projecting arm $b$ which is shown in Fig. 1 as extending into and supported from the standard $a$ to which said arm is secured by a set-screw 18. The stock B (see Fig. 6) is provided centrally with a horizontally arranged bore 20 which extends endwise of and through the stock, and said bore is enlarged diametrically, as at 21, at the forward end of the stock.

The cutter-head C is arranged next forward of and supported from the stock B. Preferably the cutter-head C (see Figs. 6 and 7) is secured to the stock B removably by suitably applied bolts or screws 22 which extend horizontally through the stock and are screwed into the cutter-head and (see Figs. 1 and 6) have heads 23 abutting against the exterior of the stock. The forward portion of the cutter-head C substantially corresponds in diameter with the arm $b$ of the stock B, and the rear end-portion of the cutter-head is larger diametrically than the forward portion of the cutter-head and substantially corresponds diametrically with the forward end of the stock. The forward portion of the cutter-head C is provided (see Figs. 1, 10 and 11) with four slots or guideways 24 which are spaced equidistantly circumferentially of a chamber 25 arranged centrally of said portion of the cutter-head. Each guideway 24 extends radially of the cutter-head C from the chamber 25 to the exterior of the cutter-head and is engaged by a cutter D. The cutter-head is provided centrally (see Figs. 6 and 9) with a bore 26 which extends endwise of the central portion of the cutter-head and is separated from the chamber 25 by a suitably formed partition 27, and said bore is therefore out of communication with said chamber. The bore 26 is arranged in line endwise with the bore 20, and a substantially horizontally arranged tube 28 is shown extending from within the bore 20 at a point rearwardly of the diametrical enlargement 21 of the last-mentioned bore forwardly into the bore 26. The cutter-head is also provided between adjacent cutters (see Figs. 1 and 9) with a hole or passageway 29 which extends from the bore 26 to a point at the exterior of the guideway-containing portion of the cutter-head. The bore 20, tube 28 and bore 26 form a passageway for receiving oil or lubricant and conducting said lubricant to the passageways 29, and each passageway 29 is employed in conducting lubricant to the exterior of the cutter-carrying portion of the cutter-head. Each cutter D has its teeth formed at its outer end in any approved manner and is adjustable or shiftable radially of the cutter-head. Each guideway 24 has its rearwardly facing forward wall formed by a circular plate H which overlaps each cutter G and is secured in place removably by suitably applied screws $h$.

Each cutter D (see Figs. 10 and 11) is provided in and centrally of one side thereof with a recess 30 which is preferably arranged between said side and a point centrally between said side and the opposite side of the cutter and extends horizontally through the cutter and is engaged by the crank 32 of a crank-shaft I which is arranged horizontally and endwise of the cutter-head and has bearing rearward of said crank in the cutter-head and forward of the crank in the plate H which is rigid with the cutter-head. Said crank extends therefore endwise of and through said recess which is parallel with said shaft. Each shaft I has its portion which has bearing in the plate H smaller diametrically than and arranged in line endwise with its portion which is arranged rearward of the cranks 32. Each shaft I has its portion which has bearing in the cutter-head rearward of its crank as large in diameter as the forward portion or remainder of the shaft so as to require the formation of the hole 33 which is formed in the cutter-head for the reception of said portion of said shaft and large enough to permit the passage of the crank 32 of the shaft endwise through said hole during the assemblage of the parts, and said crank is in contact with opposite side walls of the engaging recess 30 so as to cause the cutter thus operatively connected with said crank to be actuated inwardly or outwardly according as the shaft is rotated in the one or the other direction. To permit the reduction to a minimum of the depth of the recess 30 in each cutter and thereby avoid unduly weakening the cutter, said cutter and the crank-shaft operatively connected with said cutter have such relative arangement that the cutter is arranged in the main at one side of the axis of the shaft, and the cutter-head (see Fig. 10) is recessed or cut away, as at 31, at one of the walls of the slideway engaged by said cutter and opposite the recess 32 in each cutter and from end to end of said recess, as shown in dotted lines, Fig. 11, to avoid interference with the operation and location of the crank engaging said recess and to permit replacement of said cutter upon the removal of the plate H.

The bore 26 in the cutter-head connects at its rear end (see Fig. 6), with a circular chamber 34 formed in the rear end-portion and extending to the rear extremity of the cutter-head and around the tube 28 and arranged concentrically relative to said tube. The chamber 34 is not only large enough diametrically to receive an internal gear J which has bearing in the cutter-head at the surrounding wall of said chamber and extends circumferentially of and is concentric relative to the tube 28, but to permit extension of the shafts I to said chamber and the formation on the rear end of each shaft I of a spur-gear 35 which meshes with the internal gear J. That is, each shaft I is operatively provided at its rear end with a spur-gear 35 which is arranged within the forward portion of the chamber 34. The gear J has a rearwardly projecting annular flange 36 which is arranged concentrically relative to the tube 28 and provided externally with a handle 37 extending to and beyond the exterior of the cutter-head and employed in rotating said gear. The handle 37 is shown projecting outwardly through a slot 38 formed in the cutter-head at the surrounding wall of the chamber 34, which slot extends from said chamber outwardly to the exterior of the cutter-head and far enough circumferentially of said chamber to accommodate the location and operation of said handle. Obviously the gears 35 are spaced from and circumferentially of a point centrally of the cutter-head, and said gears correspond so that all of the shafts I are rotated simultaneously and correspondingly during the actuation of the gear J.

As the cutters D are shown in their outer and operative position ready for operation on and internally of the tubular or hollow member or work $w$ which is fed to and along and screw-threaded internally by the cutters, the handle 37 is shown as having been shifted in the direction indicated by the arrow 39, Figs. 3 and 7, and as having thereby effected the rotation of the shafts I in said direction as required to effect movement of the cutters from their inner or inoperative position (not shown) into their outer and operative position illustrated, and it will be observed that when the cutters are in their operative position the rotation of the shafts I in the opposite direction actuates the cutters inwardly and thereby withdraws the cutters from their operative position.

Within the diametrical enlargement 21 of the bore 20 in the stock B (see Figs. 6 and 7) is arranged a coiled spring K which is coiled around the tube 28 and is attached at one end, as at 40, to the stock and at its other end, as at 42, to the flange 36 of the gear J.

By the construction hereinbefore described it will be observed that the crank-shafts I, and consequently the cutters D, are operatively connected with the gear J, and said shafts are rotated in the one direction or the other according as said gear is rotated in the one or the other direction.

In the outer or operative position of the cutters D the spring K is under such tension as may be required to rotate the gear J and shafts I in the direction required to effect a shifting of the cutters inwardly and thereby withdraw the cutters from said position when said gear and said shafts are rendered free, in said position of the cutters, to rotate in said direction. Locking means whereby the internal gear J and the shafts I are locked against rotation in said direction by the spring K are provided, and said locking means, as will hereinafter appear, are operative in the operative position of the cutters but adapted to be rendered inoperative by an arm $l$ of an endwise shiftable rod L which (see Figs. 1, 3, 4, 5 and 7) is arranged horizontally and endwise of and supported from the stock B and cutter-head C. Preferably the means employed for locking the gear J and the shafts I as against rotation by the spring K in the operative position of the cutters (see Figs. 1, 2, 5 and 6) comprise an endwise shiftable pin M which (see Fig. 6) is arranged within and endwise of the stock and parallel with the axis of said gear and engages a hole 44 formed in and centrally of and extending endwise of and through a correspondingly arranged circular block or member N which supports said pin and is seated at its circumferential surface in the stock and adjustable about its own axis. The pin-supporting member N is parallel with the pin M and consequently parallel with the axis of the gear J. The pin M is supported therefore independently of the gear J, and said pin is provided at its forward end with a head $m$. In the operative position of the cutters D the pin M is in its forward and operative position in which the head $m$ of the pin is spaced forwardly from the forward end of the pin-supporting member N so as to permit rearward movement of said pin against the action of a coiled spring P which is coiled around said pin between the forward end of the pin-supporting member N and the head $m$. The spring P extends into a recess 45 formed in the rear end of the head $m$ and acts to retain the pin M in its forward and operative position shown in Fig. 6. The stock B is chambered interiorly, as at 46, to accommodate the location and operation of the pin M, pin-supporting member N and arm $l$ of the rod L.

The gear J is provided at the rear or outer end of its flange 36 (see Figs. 4, 5 and 7) with a shoulder J' preferably formed by one end face of a curved plate or member 47 which is secured to said flange in any approved manner and arranged concentrically relative to the axis of the gear, and said shoulder faces in the direction in which said gear is rotated in shifting the cutters from an operative into an inoperative position and in the operative position of the cutters abuts against a member 48 of the head $m$ of the pin M. That is, the pin M has a member 48 which in the operative position of the cutters is engaged by the shoulder J' of the gear J when the pin is in its forward and operative position so as to lock said gear and the shafts I against rotation in the direction in which said gear is rotated in shifting the cutters from an operative into an inoperative position, and of course said pin is rendered inoperative by shifting the pin far enough endwise in the required direction. The member 48 of the pin M is arranged at the face and projects forwardly of the head m of said pin, and said member 48 is spaced from the axis of the pin. Of course the cutters D during the shifting of the same from an inoperative position into an operative position move against the action of the spring K which acts therefore to retain the cutters in their inoperative position. The stock B (see Figs. 4, 5 and 7) is, of course, recessed or cut away whenever required, as at 50, to accommodate the location of the member 47 of the gear J and the arm l of the rod L. By the construction hereinbefore described it is obvious that all that is required to actuate the cutters D by the spring K from an operative to an inoperative position is to render the pin M inoperative by shifting it far enough rearwardly to disengage the member 48 of said pin from the shoulder J' of the gear J. The head m of the pin M (see Figs. 2, 5 and 6) is provided with a rearwardly projecting member 49 which is parallel with the axis of and projects into the pin-supporting member N which is provided with a hole 51 loosely engaged by said member 49 and extending beyond the rear or free end of said member 49 far enough to permit rearwardly endwise shifting of the pin M independently of the pin-supporting member. That is, the relative arrangement of the parts is such that the member 49 of the pin M projects into the hole 50 in any position of the pin. The pin M is therefore operatively connected with the pin-supporting member N so far as concerns readjustment of the pin about its axis by and simultaneously with a readjustment of the pin-supporting member about its own axis for the purpose of accurately adjusting the cutters relative to the work to be operated on without interfering with the shiftability of said pin endwise and independently of the pin-supporting member. Preferably the member 48 of the pin M is formed by the head of a screw which is screwed into the head m of the pin and extends endwise of and through the last-mentioned head and beyond the rear end of said last-mentioned head, and the member 49 of the head m is preferably formed by the shank of said screw.

The pin-supporting member N (see Figs. 1 and 2) is secured in the desired adjustment about its own axis by two screws R and r carried by the stock B and spaced circumferentially of said pin-supporting member and abutting against shoulders 52 and 53 formed on the pin-supporting member. That is, the pin-supporting member N is provided with two shoulders 52 and 53 spaced circumferentially of said member and engaged by the inner ends of the screws R and r respectively, which screws are preferably screwed into the stock B from the exterior of the stock and somewhat converge inwardly, and said shoulders form walls of recesses 54 which are formed in the pin-supporting member N and are large enough in dimensions to accommodate the location of said screws and a readjustment of said pin-supporting member and the connected pin M about their axes by a proper manipulation of said screws.

The stock B is apertured, as at 55, at the outer side of the pin-supporting member N (see Figs. 1 and 2) to effect the exposure, at the circumference of the stock, of a portion of said pin-supporting member, and the circumferential surface of said pin-supporting member is visible therefore at the exterior of the stock and graduated, as at 56, Fig. 1, to indicate the circumferential adjustment of the pin M and consequently to indicate the adjustment of the cutters.

The arm l of the rod L in the forward and normal position of said rod is arranged next forward of or overlaps the face of the head m of the pin M, so that during the shifting of said rod rearwardly said pin is actuated rearwardly to remove its member 48 rearwardly from the shoulder J' of the gear J and thereby render said gear and the connected shafts I free to be rotated by the spring K in the direction required to withdraw the cutters D from the work operated on by the cutters. Obviously the rod L while being shifted rearwardly moves against the action of the spring P which therefore acts to retain said rod in its forward and normal position. The rod L may be actuated rearwardly endwise in any approved manner, and (as shown in Figs. 1, 3 and 5) said rod is provided at its forward end and externally of the cutter-head with a downwardly projecting arm 57 which is shown removably secured to said arm by a suitably applied screw 58, and the work-feeding head E has an arm or projecting member 60 arranged to come into engagement at the proper time, during the feeding of the work w while said work is being operated on by the cutters D, with the arm 57 of the rod L and thereupon actuate said rod rearwardly to effect the actuation of the pin M rearwardly, and the relative arrangement of the parts is such that when the cutters have completed their operation on the work the pin M shall have been shifted by the rod L rearwardly far enough to have disengaged its member 48 from the shoulder J' of the gear J so as to release said gear from said member of said pin and consequently unlock the gears 35 subject to the action of the spring K and permit the latter to rotate said gears in the direction required to effect the rotation of the shafts I in the direction required to shift the cutters into their inoperative position and thereby cause said cutters to release the work.

To replace the cutters D by other cutters, the plate H is removed from the forward end of the cutter-head, whereupon the shafts I are manipulated to permit the withdrawal of the cutters forwardly from the cutter-head and the application of other cutters to said shafts.

What I claim is:—

1. In a device for cutting screw-threads, a cutter-head provided with guideways which extend radially of and to the exterior of the cutter-head; cutters engaging the guideways, each cutter being provided at and centrally of one side thereof with a recess extending horizontally through the cutter; a plate forming the rearwardly facing wall of the aforesaid guideways and removably secured in place; a crank-shaft having its crank extending endwise of and through the aforesaid recess, said shaft being arranged longitudinally of the cutter-head and having bearing in the cutter-head rearward of its crank and also having bearing in the aforesaid plate and having its portion which has bearing in the cutter-head rearward of said crank as large in diameter as any farther forwardly arranged portion of the shaft.

2. In a device for cutting screw-threads, a cutter-head having its forward portion provided with radially arranged spaced cutters and provided centrally of said portion with a chamber and having guideways for the cutters of the cutter-head, which guide-ways extend from said chamber to the exterior of the cutter-head, said cutter-head being provided rearward of said chamber and centrally with a lubricant-receiving bore which is out of communication with said chamber, and the cutter-head having passageways which extend from said bore to the exterior of the aforesaid portion of the cutter-head.

3. In a device for cutting screw-threads, a stock provided centrally with a horizontally arranged bore which is adapted to receive lubricant and extends endwise of the stock; a cutter-head arranged next forward of and secured to the stock and provided centrally of its forward portion with a chamber and having guideways which extend from said chamber to the exterior of the cutter-head, which cutter-head is provided with cutters engaging said guide-ways and has a centrally located bore arranged rearwardly of and out of communication with said chamber and arranged in line endwise with the aforesaid bore in the stock, said cutter-head being provided with passageways which extend from the bore in the cutter-head to the exterior of the aforesaid portion of the cutter-head, and a tube establishing communication between the bore in the stock and the bore in the cutter-head and arranged wholly rearward of the aforesaid passageways.

4. In a device for cutting screw-threads, a stock; a cutter-head arranged forward of and supported from the stock and provided internally with a chamber and having guideways arranged forward of said chamber and extending to the exterior of the cutter-head; cutters engaging said guideways; an internal gear having bearing in the cutter-head circumferentially of said chamber; spaced corresponding spur-gears meshing with said internal gear and operatively connected with the different cutters respectively; a suitably applied spring which is under such tension in the operative position of the cutters as may be required to rotate the gears in the direction necessary to shift the cutters from an operative into an inoperative position when said gears are rendered free, in the operative position of the cutters, to rotate in said direction, and locking means whereby said gears are locked against rotation in said direction, said locking means being operative in the operative position of the cutters but adapted to be rendered inoperative.

5. In a device for cutting screw-threads, a stock; a cutter-head arranged forward of and supported from the stock and provided internally with a circular chamber and having guideways arranged forward of said chamber and extending to the exterior of the cutter-head; cutters engaging said guideways; an internal gear having bearing in the cutter-head at the surrounding wall of said chamber; spaced corresponding spur-gears meshing with said internal gear and operatively connected with the different cutters respectively; a suitably supported coiled spring arranged at the rear of the aforesaid chamber and attached at one end to the stock and at its other end to the internal gear, said spring being under such tension in the operative position of the cutters as may be required to rotate the gears in the direction necessary to shift the cutters from an operative into an inoperative position when said gears are rendered free, in the operative position of the cutters, to rotate in said direction, and locking means whereby said gears are locked against rotation in said direction, said locking means being operative in the operative position of the cutters but adapted to be rendered inoperative.

6. In a device for cutting screw-threads, a cutter-head provided in its forward portion and centrally with a chamber and having guideways which extend radially of and to the exterior of the cutter-head from and are spaced circumferentially of said chamber; cutters engaging the guideways; a cutter-actuating crankshaft for each cutter, which crank-shaft has its crank operatively connected with said cutter and is supported from the cutter-head; a suitably supported internal gear operatively connected with the cutters and having a shoulder which faces in the direction in which said gear is rotated to shift the cutters from an operative into an inoperative position; means acting to rotate said gear in said direction when the cutters are in an operative position, and a pin which is substantially parallel with the axis and supported independently of said gear and adjustable about its own axis and provided with a member which is spaced from the axis of the pin and engaged by the aforesaid shoulder in the operative position of the cutters, said pin and said gear being capable of being relatively positioned in the operative position of the cutters to permit said gear to rotate in the aforesaid direction.

7. In a device for cutting screw-threads, a cutter-head provided in its forward portion and centrally with a chamber and having guideways which extend radially of and to the exterior of the cutter-head from and are spaced circumferentially of said chamber; cutters engaging the guideways; a cutter-actuating crank-shaft for each cutter, which crank-shaft has its crank operatively connected with said cutter and is supported from the cutter-head; a suitably supported internal gear operatively connected with the cutters and having a shoulder which faces in the direction in which said gear is rotated in shifting the cutters from an operative into an inoperative position; a spring acting to rotate said gear in said direction in the operative position of the cutters, and a pin supported independently of said gear and having a member which in the operative position of the cutters is engaged by the aforesaid shoulder when the pin is in its locking position, said pin being shiftable in the direction required to move its said member out of engagement with said shoulder and thereby render said gear subject to the action of the aforesaid spring.

8. In a device for cutting screw-threads, a cutter-head provided with shiftable cutters; a suitably supported internal gear operatively connected with the cutters and having a shoulder which faces in the direction in which said gear is rotated to shift the cutters from an operative into an inoperative position; means acting in the operative position of the cutters to rotate said gear in said direction; an endwise shiftable pin which is substantially parallel with the axis of said gear and provided at its forward end with a forwardly projecting member which is spaced from the axis of the pin and engaged by the aforesaid shoulder in the operative position of the cutters; said pin being in its forward position in the last-mentioned position of the cutters; means acting to retain said pin in its forward position and in said position being shiftable far enough rearwardly to disengage its aforesaid projecting member from the aforesaid shoulder; a suitably supported circular member surrounding and supporting said pin, said pin-supporting member being adjustable about its own axis, and means for securing said pin-supporting member in the desired adjustment, the pin being movable with the pin-supporting member during a readjustment of the pin-supporting member about its axis, and the pin-supporting member being arranged to permit the requisite endwise shiftability of the pin independently of the pin-supporting member.

9. In a device for cutting screw-threads, a stock; a cutter-head arranged forward of and supported from the stock and provided with shiftable cutters; a suitably supported internal gear operatively connected with the cutters and having a shoulder which faces in the direction in which said gear is rotated to shift the cutters from an operative into an inoperative position; means acting in the operative position of the cutters to rotate said gear in said direction; an endwise shiftable pin which is substantially parallel with the axis of said gear and provided at its forward end with a forwardly projecting member which is engaged by the aforesaid shoulder in the operative position of the cutters and spaced from the axis of the pin, said pin being in its forward position in the last-mentioned position of the cutters; means acting to retain the pin in its forward position and in said position being shiftable far enough rearwardly to disengage its aforesaid projecting member from the aforesaid shoulder; a circular member surrounding and supporting said pin, said pin-supporting member having bearing in the stock and being adjustable about its own axis and having two shoulders spaced circumferentially of said axis, and screws screwed into the stock and abutting against said shoulders, the pin being movable with the pin-supporting member during the readjustment of the pin-supporting member about its axis.

10. In a device for cutting screw-threads, a cutter-head provided with shiftable cutters; a suitably supported internal gear operatively connected with the cutters and having a shoulder facing in the direction in which said gear is rotated to shift the cutters from an operative into an inoperative position; means acting in the operative position of the cutters to rotate said gear in said direction; an endwise shiftable pin which is substantially parallel with the axis of said gear and provided at its forward end with a head having a forwardly projecting member which is engaged by the aforesaid shoulder in the operative position of the cutters and spaced from the axis of the pin, said head having a rearwardly projecting member which is parallel with the pin, said pin being in its forward position in the last-mentioned position of the cutters; means acting to retain the pin in its forward position, and a suitably supported member surrounding and supporting said pin and spaced far enough rearwardly from the aforesaid head in the forward position of the pin to permit rearward movement of the pin the extent required to disengage the aforesaid forwardly projecting member of said head from the aforesaid shoulder, said pin-supporting member being provided with a hole engaged by the aforesaid rearwardly projecting member of said head, in any position of the pin.

11. In a device for cutting screw-threads, a cutter-head provided with shiftable cutters; a suitably supported internal gear operatively connected with the cutters and having a shoulder facing in the direction in which said gear is rotated to shift the cutters from an operative into an inoperative position; means acting in the operative position of the cutters to rotate said gear in said direction; an endwise shiftable pin which is substantially parallel with the axis of said gear and provided at its forward end with a head having a forwardly projecting member which is engaged by the aforesaid shoulder in the operative position of the cutters and spaced from the axis of the pin, said head having a rearwardly projecting member which is arranged parallel with the pin, said pin being in its forward position in the last-mentioned position of the cutters; means acting to retain the pin in its forward position; a suitably supported circular member surrounding and supporting said pin and spaced far enough rearwardly from the aforesaid head in the forward position of the pin to permit rearward movement of the pin the extent required to disengage the aforesaid forwardly projecting member of said head from the aforesaid shoulder, said pin-supporting member having bearing in the stock and adjustable about its own axis and being provided with a hole engaged by the aforesaid rearwardly projecting member of said head, which hole is engaged by the last-mentioned projecting member in any position of the pin, and means for securing the pin-supporting member in the desired adjustment.

In testimony whereof, I sign the foregoing specification, in the presence of two witnesses.

THOMAS SHEHAN.

Witnesses:
  HERBERT C. WOOD,
  B. C. BROWN.

Copies of this patent may be obtained for five cents each, by addressing the "Commissioner of Patents, Washington, D. C."